United States Patent
Antinori et al.

(10) Patent No.: US 12,407,503 B2
(45) Date of Patent: Sep. 2, 2025

(54) LABEL FILTERING AND ENCRYPTION

(71) Applicant: Red Hat, Inc., Raleigh, NC (US)

(72) Inventors: Paolo Antinori, Milan (IT); Sergio Fernando Ocon Cardenas, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 226 days.

(21) Appl. No.: 17/969,539

(22) Filed: Oct. 19, 2022

(65) Prior Publication Data

US 2024/0137218 A1 Apr. 25, 2024
US 2024/0235828 A9 Jul. 11, 2024

(51) Int. Cl.
H04L 9/08 (2006.01)

(52) U.S. Cl.
CPC .................................. H04L 9/088 (2013.01)

(58) Field of Classification Search
CPC ...................................................... H04L 9/088
See application file for complete search history.

(56) References Cited

U.S. PATENT DOCUMENTS

| | | | |
|---|---|---|---|
| 8,788,811 B2* | 7/2014 | Fu ......................... | H04L 9/3268 380/278 |
| 9,213,566 B2* | 12/2015 | Morris ................ | G06F 9/45537 |
| 9,294,442 B1* | 3/2016 | Lian .................... | H04L 63/0263 |
| 9,882,714 B1* | 1/2018 | Cignetti ................. | H04L 9/083 |
| 10,009,317 B2 | 6/2018 | Woolward | |
| 10,852,981 B2* | 12/2020 | McCloskey ........... | G06F 3/0647 |
| 11,343,080 B1* | 5/2022 | Bagley .................... | G06F 21/31 |
| 11,907,393 B2* | 2/2024 | Sambamoorthy ..... | G06F 16/285 |
| 12,045,657 B2* | 7/2024 | Sudhakaran .......... | G06F 9/5072 |
| 2002/0138308 A1* | 9/2002 | Harada ................... | G06Q 40/08 705/4 |

(Continued)

FOREIGN PATENT DOCUMENTS

| | | | | |
|---|---|---|---|---|
| CN | 116746114 A | * | 9/2023 | ......... H04L 63/0471 |
| WO | WO-2017147819 A1 | * | 9/2017 | ......... G06F 21/6209 |

OTHER PUBLICATIONS

NPL Search History (Year: 2024).*

(Continued)

*Primary Examiner* — John B King
(74) *Attorney, Agent, or Firm* — Kilpatrick Townsend & Stockton LLP (57) ABSTRACT

Systems and methods for securing label metadata. One aspect presented herein includes a container orchestration system comprising a plurality of worker nodes, able to run application containers; an orchestrator node to orchestrate application container deployment on the plurality of worker nodes via a virtual network layer, wherein the plurality of worker nodes and the orchestrator node form a cluster, the orchestrator node comprising an API server that serves as an entry point to the cluster; an encryption layer run on the master node comprising a processor and a computer readable medium storing instructions executable by the processor to: receive a deployment file via the API server; associate an encryption key with the sensitive metadata; receive a request for data, via the virtual network layer, from at least one worker node, wherein the request for data includes the sensitive metadata; provide the sensitive metadata to the at least one worker node.

20 Claims, 6 Drawing Sheets

(56) References Cited

U.S. PATENT DOCUMENTS

| | | | | |
|---|---|---|---|---|
| 2005/0246526 | A1* | 11/2005 | Forlenza | H04L 9/088 |
| | | | | 713/165 |
| 2008/0165973 | A1* | 7/2008 | Miranda Gavillan | |
| | | | | G06F 21/6209 |
| | | | | 380/278 |
| 2009/0067633 | A1* | 3/2009 | Dawson | H04L 9/0822 |
| | | | | 380/279 |
| 2010/0132011 | A1* | 5/2010 | Morris | G06F 21/53 |
| | | | | 718/1 |
| 2011/0296172 | A1* | 12/2011 | Fu | H04L 9/3263 |
| | | | | 713/156 |
| 2012/0110651 | A1* | 5/2012 | Van Biljon | H04L 63/101 |
| | | | | 709/201 |
| 2012/0140923 | A1* | 6/2012 | Lee | H04L 9/0894 |
| | | | | 380/44 |
| 2016/0188894 | A1* | 6/2016 | Factor | G06F 21/602 |
| | | | | 713/165 |
| 2016/0294774 | A1* | 10/2016 | Woolward | H04L 63/1491 |
| 2017/0093574 | A1* | 3/2017 | D'Elena | G06F 21/6209 |
| 2017/0279770 | A1* | 9/2017 | Woolward | H04L 63/0263 |
| 2017/0357817 | A1* | 12/2017 | Tamura | H04L 9/0863 |
| 2018/0069842 | A1* | 3/2018 | McCallum | H04L 63/061 |
| 2018/0262481 | A1* | 9/2018 | Doi | H04L 9/0866 |
| 2019/0068372 | A1* | 2/2019 | Bhatnagar | H04L 51/18 |
| 2019/0163910 | A1* | 5/2019 | Moon | G06F 21/54 |
| 2019/0258813 | A1* | 8/2019 | Lewis | H04L 9/088 |
| 2019/0268341 | A1* | 8/2019 | Hugot | H04L 63/08 |
| 2020/0034528 | A1* | 1/2020 | Yang | G06F 21/6209 |
| 2020/0076578 | A1* | 3/2020 | Ithal | H04L 63/0272 |
| 2020/0356536 | A1* | 11/2020 | Nilsson | G06F 16/122 |
| 2021/0011816 | A1* | 1/2021 | Mitkar | G06F 11/301 |
| 2021/0055885 | A1* | 2/2021 | Strathman | G06F 3/0665 |
| 2021/0058248 | A1* | 2/2021 | Bursell | H04L 9/088 |
| 2021/0073808 | A1* | 3/2021 | Gu | G06Q 20/367 |
| 2021/0234673 | A1* | 7/2021 | Kurian | H04L 9/3234 |
| 2021/0263759 | A1* | 8/2021 | Pascual | H04L 9/3263 |
| 2022/0104010 | A1* | 3/2022 | Stockhammer | H04L 9/088 |
| 2022/0182298 | A1* | 6/2022 | Degioanni | H04L 43/045 |
| 2022/0222184 | A1 | 7/2022 | Irwin et al. | |
| 2022/0263655 | A1* | 8/2022 | Murray | H04L 63/0823 |
| 2022/0263835 | A1* | 8/2022 | Pieczul | H04L 63/101 |
| 2022/0350933 | A1* | 11/2022 | Bono | G06F 21/79 |
| 2023/0043336 | A1* | 2/2023 | Mitkar | G06F 3/0631 |
| 2023/0105207 | A1* | 4/2023 | Srivastava | G06F 16/906 |
| | | | | 726/26 |
| 2023/0153450 | A1* | 5/2023 | Mainer | G06F 21/6218 |
| | | | | 726/27 |
| 2023/0153457 | A1* | 5/2023 | Mainer | H04L 67/10 |
| | | | | 726/26 |
| 2024/0012717 | A1* | 1/2024 | Mitkar | G06F 21/6218 |
| 2024/0137218 | A1* | 4/2024 | Antinori | H04L 9/088 |
| 2024/0223362 | A1* | 7/2024 | Barella | H04L 9/088 |

OTHER PUBLICATIONS

Mannambeth, Kubernetes for Beginners (Year: 2018).*

Yim, Metadata-Driven Information Security Model for Enterprise Content Management (Year: 2018).*

Well-Known Labels, Annotations and Taints _ Kubernetes (Year: 2017).*

Dynatrace LLC "Organize Kubernetes/OpenShift Deployments by tags," 5 pages, downloaded Sep. 8, 2022, available at https://www.dynatrace.com/support/help/how-to-use-dynatrace/infrastructure-monitoring/container-platform-monitoring/kubernetes-monitoring/leverage-tags-defined-in-kubernetes-deployments.

Kubernets Authors "Labels and Selectors," 6 pages, last modified on Aug. 9, 2022, available at https://kubernetes.io/docs/concepts/overview/working-with-objects/labels/.

Microsoft 365 licensing guide for security and compliance, "Restrict access to content by using sensitivity labels to apply encryption," 28 pages, Aug. 24, 2022, available at https://docs.microsoft.com/en-us/microsoft-365/compliance/encryption-sensitivity-labels?view=o365-worldwide.

Sharma, "Auto-Labeling Kubernetes Resources with Kyverno," 7 pages, available at https://nirmata.com/2020/10/30/auto-labeling-kubernetes-resources-with-kyverno/.

* cited by examiner

LABEL FILTERING AND ENCRYPTION

FIELD

The present technology pertains to systems and methods for securing sensitive metadata information and especially labels metadata information in a cluster managed by an open source container orchestration platform. In particular, but not by way of limitation, the present technology provides systems and methods for Label Filtering and Encryption.

BACKGROUND

Open source container orchestration platforms (also referred to herein as an "application orchestration system", or "orchestration system") like Kubernetes, are software programs used to coordinate deployment and runtime lifecycle of scripts, applications, processes, and software running on a cluster of nodes and may also automate software deployment, scaling, and management across a target system. Kubernetes, for example, may be used as a target platform, where software, applications, or program instructions are provided to Kubernetes which then manages a large cluster of virtual, physical, hybrid, cloud machines, or a combination of these to manage the running of the software. The software and/or instructions provided to Kubernetes or a Kubernetes target system may contain sensitive information or metadata that need to be handled in a specific manner.

SUMMARY

In various embodiments the present technology is directed to an automated computer implemented method for securing metadata receiving a deployment file, wherein the deployment file comprises metadata, and wherein the deployment file assigns sensitivity categories to metadata; receiving an encryption key, wherein the encryption key is associated with a sensitive metadata; storing the sensitive metadata, wherein the sensitive metadata is encrypted using the associated encryption key; storing the associated encryption key; determining that data is required by a node, wherein the data includes the sensitive metadata; and based on access permissions of the node, providing the sensitive metadata to the node.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

An orchestration system may be a Kubernetes run target system, or alternative platforms that may provide some or all of the functions of a Kubernetes system, including Docker, OpenShift, or Salt Stack. Typically, orchestration systems are run in an architecture that includes a master or controller node, and multiple worker nodes, the multiple worker nodes unified by a virtual layer that is able to utilize each of their individual resources. Each worker node may contain a pod that in turn contains several application containers, the way the containers are distributed, the methods and scheduling of app deployment on worker nodes, as well as the number of instances of each container are all directed by the master or controller node (also referred to herein as an "orchestrator" or "orchestrator node"). When a software file or instructions are received from an operator such as a client-side system, a logical unit called a deployment unit which holds information about the application is created, the deployment unit may be defined by a deployment file which may be a .yaml document or JSON file, the deployment file created by the user or client-side server or system is transmitted to the orchestration system target system via an API server or endpoint to have the orchestration system deploy and manage software according to instructions are provided in the deployment file.

Resources defined in a deployment file and run on a Kubernetes target system may be very different from each other, each with their specific structure, classes, methods, or programming objects, each resource or document, for example an XML schema, a CSS file, a JavaScript file, or any app or scriplet, are all different and have their own specific functional characteristics. These resources may be utilized by the orchestration target system in a specific manner according to the specific characteristics, purpose, and functions of the resource. However, these resources may also share similar elements, or metadata. This metadata may be shared across all or a large number of resources across the orchestration system. For example, grouping information or files based on applications, user access information, file properties metadata, naming conventions, file types, labels, access restrictions, or other attributes may all be metadata shared across several if not all resources to be run on the Kubernetes target system.

One generic metadata information that is shared across all resource groups is the information label, also referred to herein as "label metadata" or a "label". Labels are used extensively in management systems to provide filtering and grouping and to change the way systems behave. For example, labels can be used to restrict endpoints considered when provisioning new workloads. In various aspects the label may be an arbitrary string or classification attached to resources or files. Label groups or labels themselves may be agreed upon or used across industries, companies, or various nodes or clusters of the orchestration or Kubernetes target system. These labels generally do not trigger actions and are just informational in nature, and are generally treated as static informational metadata. However they may be necessary for operations, for example to identify who to contact or what to do in case of outages.

The label metadata is used in these orchestration systems to convey information or enrich the runtime or dynamic information of resources run on the system. For example when software is deployed, it may be deployed along with label metadata representing static information such as "group" of the resource. Labels may also be used to store counters that may change during a lifecycle of a process or application, software running on a virtual layer or on worker nodes may access a label and change its value or alter the label itself. Labels are accessible as metadata by almost any application, or worker node, or process running on a Kubernetes target system or any orchestration system, and orchestration systems cannot secure a label, restrict access to it by various nodes on the system, or prevent other applications or nodes from modifying the label or its value. This is especially problematic when the information used or contained within a label may provide malicious actors information that may be used to attack the target system or cluster.

The present disclosure provides a solution that restricts access to sensitive metadata including label metadata in an autonomous and automatic manner. In various aspects, the technologies presented allow an operator, for example on a client-side server or system, to define a policy that prevents some labels from being reported in some specific API, even if they are available to the orchestration system. For instance, it will allow the operator (also referred to herein as "user") to define the label to only needing to be reported or shared on some specific reports, while hiding it on most other reports.

The present disclosure, in various aspects provides an extension to these orchestration systems that will allow filters based on RBAC or API endpoints that by default show unencrypted information, to keep information hidden or encrypted, either by default or by having the operator set the information or metadata as sensitive, hidden or provide some other classification setting. The system proposed will store labels with an encryption key, and will decrypt those labels using the stored key only if a user or a specific process or node specifically asks for it, or if the orchestration system determines that this is required or necessary for a process, application, or report. In several aspects, the default setting will be that exported or reported values will be encrypted.

In several aspects the present disclosure comprises an encryption layer or encryption process that may be applied to labels, or other sensitive metadata and/or is built on top of the architecture of orchestration systems to extend the behavior of the orchestration system to provide and apply encryption and decryption techniques and control of metadata information and similar functionality. This extension may be applied to Kubernetes or any other software orchestration system and deployment management tool allowing the operator to define a policy that prevents some labels from being reported, used, or accessed in one or more APIs.

In several embodiments a virtual layer may be built or created to undertake this policy, while in other aspects a virtual layer, or a process reroutes original communications in the target system and applies encryption techniques and processes in an automated manner based on how the metadata, sensitive metadata, or labels are defined, classified, or whether a privacy level or attribute is assigned to them in a document or a deployment file. In most aspects, the orchestration system or Kubernetes continuously monitors the deployment of resources to ensure they meet the requirements of the deployment instructions as described and provided in a deployment file or other such document.

Currently, access to Kubernetes resources are provided on an application level, if a resource allows access to a specific node for example, then complete access to that resource or application is provided. The disclosure herein provides a granular way to assign permissions and restrictions to labels or other sensitive metadata by assigning them on the deployment file, by an operator or another client-side system. The deployment file is transmitted to the Kubernetes target system, and in most aspects, instructions in the received deployment file are followed or implemented by a controller node, encryption extension or layer, to apply the permissions/restrictions to each resource. Orchestration and deployment management systems such as Kubernetes are not currently "aware" of this label metadata information and do not control accessibility or restrict access to resources on this level, and based on current architectures of such systems, are unable to do so. The technologies disclosed herein allow a much more customizable and granular level of control over resources and information within resources (i.e., sensitive metadata information or data such as labels) than currently offered by any deployment management or orchestration tool or system. This allows resources to be protected and only shared when required by an application or a process on an as-needed basis.

Therefore, the systems and methods disclosed herein provide several advantages over previous technologies including, giving the client or the user control on what is sensitive and what information can be public, while allowing the Kubernetes or other orchestration system to manage these sensitivities and access restrictions automatically on a system-wide level without input or interference by a user. An external system would not be able to effectively manage restrictions within a Kubernetes cluster, or any other target system managed by an orchestration system. By providing the sensitivity levels, assigning accessibility or restriction instructions or classifications, the current disclosure allows a user to take a hands-off approach as the target system provides the service according to the instructions provided. For example a client may allow access to metadata by a software partner application but not any other application, once the software or metadata is deployed on the target system, the orchestration system is able to automatically manage access to the file or resource preventing third parties from accessing it, unless it is a partner applications or listed as such.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

Figure 1:
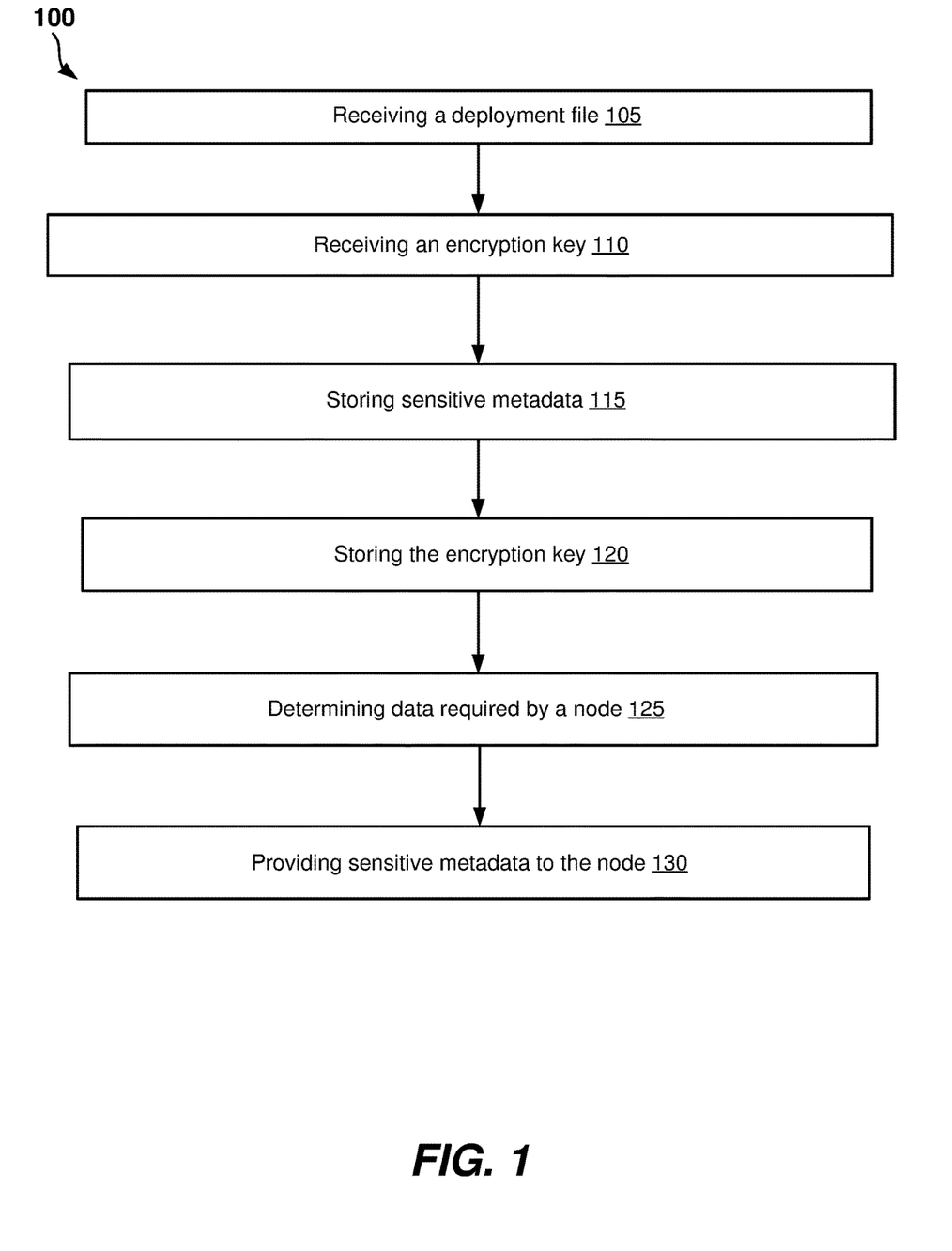
FIG. 1 presents one aspect of a method to secure or filter label metadata within an application orchestration system, according to several aspects of the present disclosure.

FIG. 1 presents one aspect of a method 100 to filter or control label metadata within an application orchestration system, according to several aspects of the present disclosure. Method 100 may commence by an application container orchestration system, or an extension or encryption layer of the orchestration system, receiving 105 a deployment file, the deployment file may contain metadata, the metadata including label data, label creation data, or label metadata. The label metadata may be in the form of "key: value" or clear text labels in another configuration. The label or label metadata may be marked, categorized, classified, or assigned a sensitivity or privacy label, or have attached to it access restrictions in the deployment file. In several embodiments all metadata or metadata of a specific category, such as a label, are by default encrypted or assigned a sensitivity or privacy label. These classifications of sensitivity, privacy, or access restrictions attached to the metadata tell the system how to treat the label metadata and allow/restrict access to it. For example, the label can be considered an encrypted label, so the system that will receive 105 the document or deployment file will be asked to recognize specific private or sensitive information labels, and in some embodiments take certain actions or security measures, such as adding encryption to these labels. In several aspects, the system may also receive 110 an encryption key that is associated with the sensitive metadata in the deployment file. In various aspects, or both the metadata and/or the encryption key are stored 115, 120 by the system, a node in the system, or a specific database, physical, cloud-based, or virtual location. When sensitive metadata or labels categorized as such are stored 115, their value is stored in an encrypted state inaccessible without being decrypted. The encryption key that is associated with the sensitive metadata may also be stored 120.

In various aspects of method 100, it is determined 125 that a particular node or a process running on a node requires specific data, this data may include sensitive metadata or sensitive label metadata. The sensitive metadata or portions of sensitive metadata such as labels, may be provided 130 to the requesting node, where the level of information or data provided may depend on the application, request, need for the data, or access level of the node. If the data is needed by the requesting node, pod, or by an application, the data may either be decrypted before being provided to the application or node, or decryption information, instructions, or the encryption key necessary to decrypt the metadata may be provided to the node to decrypt the metadata or sensitive label itself. Otherwise the sensitive metadata may be provided to the node, or the application/pod, in an inaccessible encrypted state.

Figure 2:
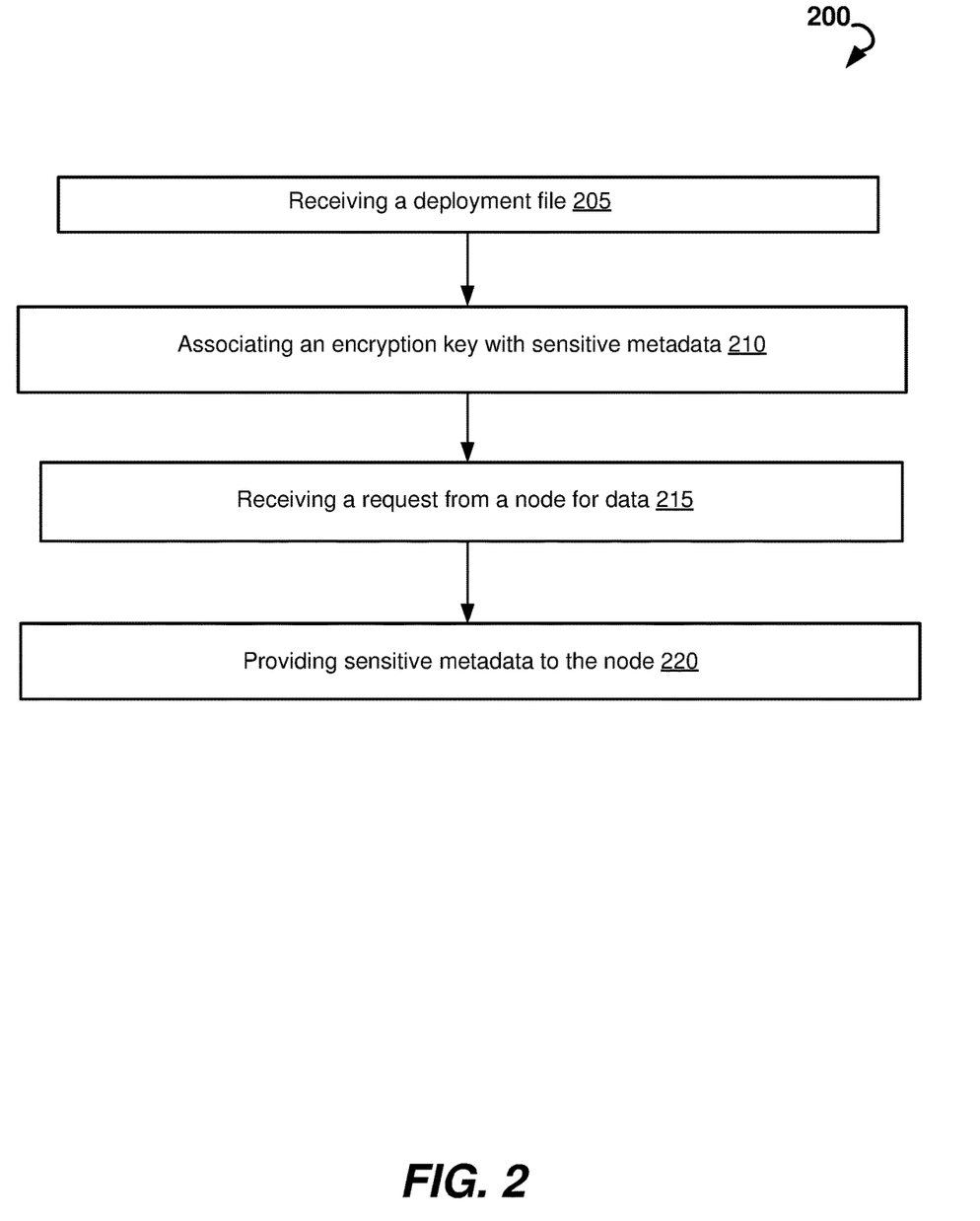
FIG. 2 presents another aspect of a method to secure or filter label metadata within an application orchestration system, according to several aspects of the present disclosure.

FIG. 2 presents another aspect of a method to filter label metadata within an application orchestration system, according to several aspects of the present disclosure. Method 200 may commence by an application container orchestration tool or system, or an extension or encryption layer of the orchestration system, receiving 205 a deployment file. The deployment file may contain metadata, the metadata including label data, label creation data, sensitive metadata, or label metadata. The label metadata may be in the form of a key:value or may be clear text labels. The label or label metadata may be marked, categorized, classified, or assigned a sensitive or privacy label, or have attached to it access restrictions in the deployment file. These classifications of sensitivity, privacy, or access restrictions attached to the metadata tell the orchestration system how to treat the label metadata.

The received deployment file's sensitive metadata or other data with access restrictions or with other privacy or sensitivity categorizations or labels may be associated 210 to an encryption key. In various embodiments of the methods disclosed herein, there may be an encryption key for each sensitive metadata or label, or alternatively multiple encryption keys associated to each sensitive data or label. In various aspects an encryption key may be shared or used across several sensitive labels or sensitive metadata.

In various aspects of method 200, a request for metadata is received 215 from a node, the request for metadata itself may be a direct request for the sensitive metadata or sensitive label metadata may be part of an overall data package or application that is requested and has sensitive data, metadata, or labels included within it. The sensitive metadata may be provided 220 to the requesting node, depending on the application, request, need for the data, or access level of the node or a related application, the sensitive metadata may be provided in either an encrypted or decrypted state. If the data is needed by the requester, the node, or by the application the data may either be decrypted before being provided to the application or node, or decryption information, instructions, or the encryption key necessary to decrypt the metadata may be provided to the node to decrypt the metadata or sensitive label itself. In some embodiments the data is not requested but it is determined that the data, sensitive metadata or label data, similarly to step 125, FIG. 1.

Figure 3:
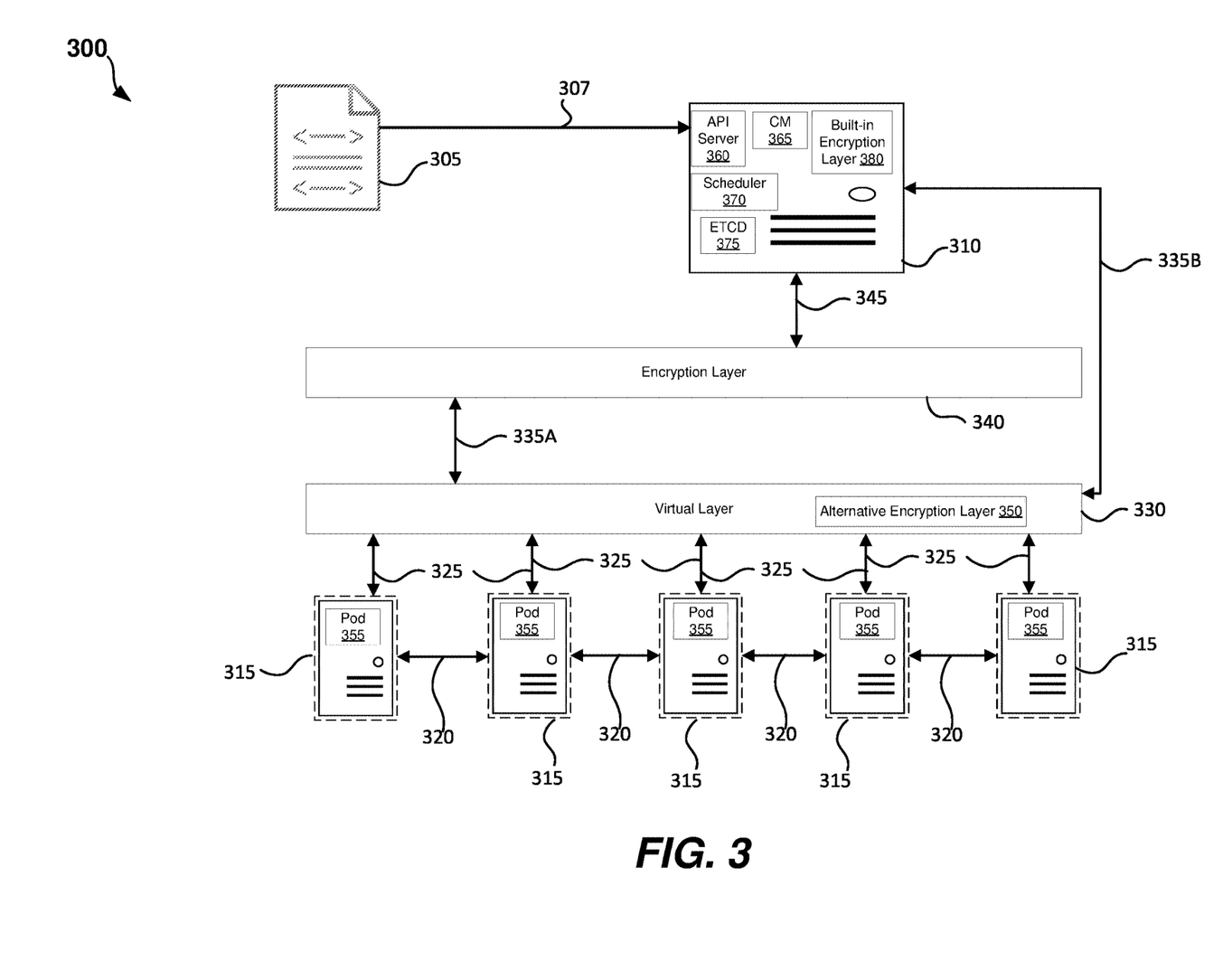
FIG. 3 presents one aspect of the architecture of a system upon which application container orchestration and metadata filtering or access restrictions may occur according to several aspects of the present disclosure.

FIG. 3 presents one aspect of a system upon which the application container orchestration and metadata filtering may occur. System 300 may be an orchestration system, for example a deployed Kubernetes system, or any other system used to coordinate deployment and runtime lifecycle of software. The system 300 may include a master or controller node 310 (also referred to herein as an "orchestration node"). The master or controller node 310 may be a standalone computing device, server, or a system comprised of multiple such devices. The controller node 310 may include an API server 360 which acts as the entry point of point of communication with the controller node 310. The controller node 310 may also include a controller manager 365 which controls the cluster and keeps track of the nodes and applications running on them. There may also be a scheduler 370 which schedules application containers for each worker node 320.

The controller node 310 may be connected to one or more worker nodes 315, each of which may be made up of one or several computing, hardware, server and other such devices all connected with the controller node 310 in a cluster. The worker nodes 315 have various processes running on them including, an underlying program to allow communication between the worker nodes 315 and/or the controller node 310, for example a Kubernetes process, as well as pods 355 that may include container(s) running within them. Typically each pod 355 running on a worker node contains a number of containers. Worker nodes 315 may communicate 320 with each other through IP addresses or services/service calls that may be connected to the pods 355 in each worker node 315. The controller node 310 may connect 335B directly to the virtual layer 330 to communicate with the worker nodes 315, or may first go through an encryption layer 340.

The controller node 310 may also include an ETCD storage 375 that includes all configuration files, status data, and time snapshots of the worker nodes 315 that may be used for backups and recovery if a worker node 315 fails or if there is an outage. The virtual network or virtual layer may act as a virtual application or a virtual communication layer that runs across all worker nodes 315, unifying the worker nodes 315 to act as if they are one virtual machine and facilitates communications between the controller node 310, essentially allowing all worker nodes to act as a unified powerful virtual machine. Communications between the worker nodes 315 and the controller node 310 may also go through the virtual layer 330 which then communicates 335A through the encryption layer 340 to and from the controller node 310.

In various aspects a deployment file or document 305 that includes instructions, data and metadata, as well as sensitivity labels, categories, and classifications may be sent or transmitted 307 to the controller node 310 via the API server 360 from an operator, an external system, or client-side program/system. The metadata or label-level metadata may be classified as sensitive, or be assigned permission or access levels/attributes by the operator, or by the client-side program, or the process that sends the deployment file 305 to the master or controller node 310. The controller node 310 may then run all metadata or label data/metadata through the encryption layer 340 which undertakes to encrypt, decrypt, store and undertake the other methods disclosed in this document. In several aspects the encryption layer 340 is between a controller node 310 and the virtual layer 330, and in other aspects it an alternative encryption layer 350 that resides within the virtual layer 330. Further, the encryption layer may in various aspects be part of the controller node 310 and reside on it, for example, as built-in encryption layer 380. Each of the different components of FIG. 3 may be software processes, virtual machines, host machines, or a combination.

In several aspects, the system 300 continuously monitors the states of applications, or other resources running on the system, via the controller node 310, to ensure that the deployment file 305 and its instructions regarding each deployed asset or resource is adhered to. If for any reason the state of the resource, its access level or access to a resource is modified or altered, then relevant worker nodes 315, or other components of system 300 may be notified, in many instances via an API call from controller node 310. The notification may be limited in the information provided describing the state of the resource that has changed, or it may be detailed containing information about the values that have been altered, the name, or other information about the label. In various aspects only obscure strings are provided in the value fields of a label when indicating a change has occurred to other nodes. The level of information provided about each label or relevant sensitive metadata, and the values attached to these depends on the classification provided or assigned to each label or sensitive metadata in the deployment file, as well as any permissions or restrictions attached to the label or sensitive metadata, whether they are specific or general.

Figure 4:
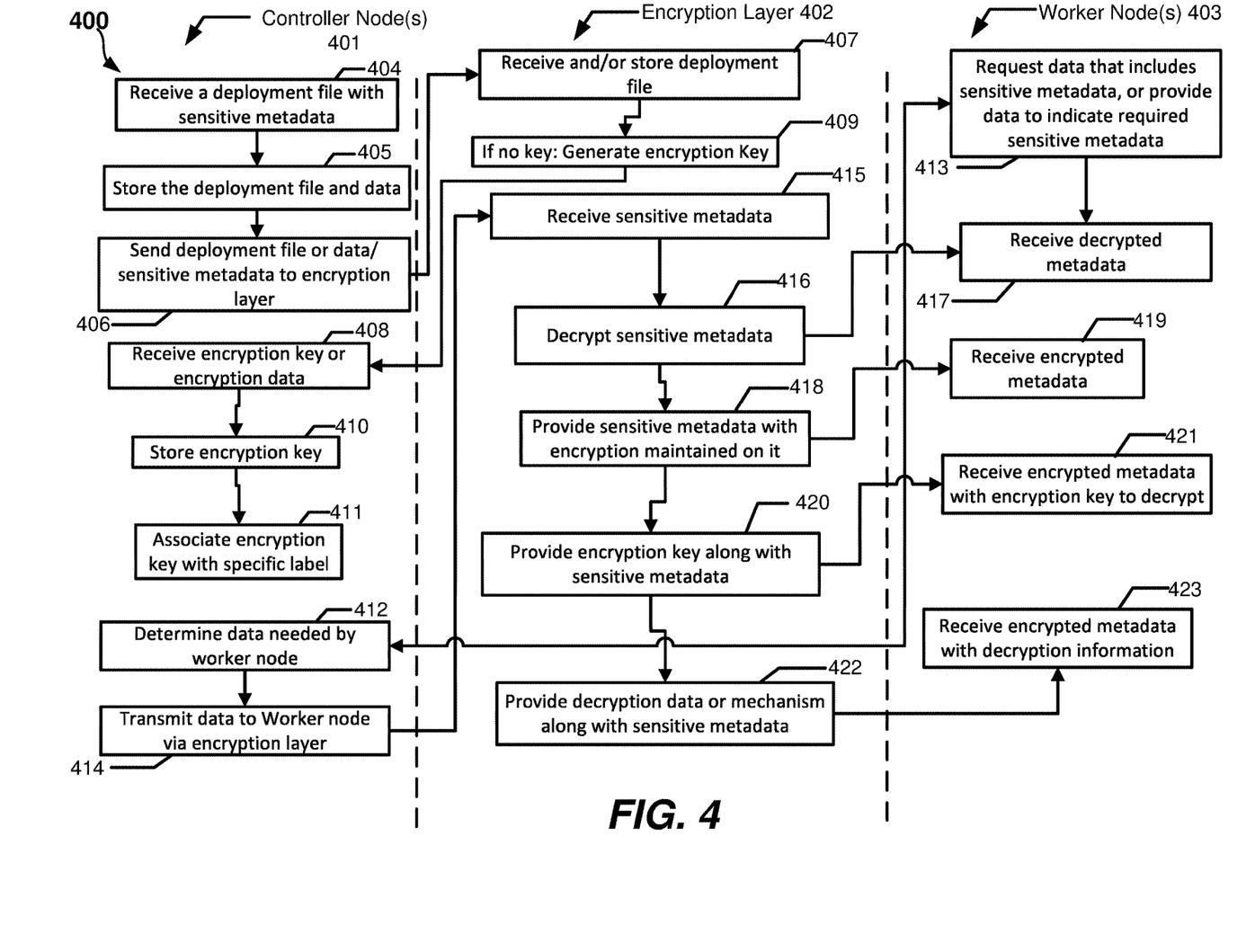
FIG. 4 presents a diagram illustrating the relationship between the various parts of the orchestration system upon which the various methods presented herein may occur according to several aspects of the present disclosure.

FIG. 4 presents a diagram illustrating the relationship between the various parts of the system 400 according to several aspects of the present disclosure. FIG. 4 presents various systems and steps, all of which are optional and may be combined with each other in any order or combination. The system 400 may in one aspect comprise master or controller nodes 401, which may include one or more such controller nodes 401, for example similar to controller node 310, FIG. 3. The system may also comprise an encryption extension or encryption layer 402, for example similar to encryption layer 340, FIG. 3, that may be an independent encryption layer that is an extension of the orchestration system, or in some instances an encryption layer that runs as part of the controller node 401 (for example encryption layer 380, FIG. 3) or in some instances as part of other components or nodes of the system 400, similar to alternative encryption layer 350, FIG. 3. The system may also comprise worker nodes 403 which may include one or more worker nodes 403, for example worker nodes 315, FIG. 3.

In several aspects, a deployment file, similar to deployment file 305, FIG. 3 for example, is received 404 by the controller node 401, via an API server, or other communication protocol, usually from a client-side process or request. Optionally, the deployment file may be stored 405 by the controller node 401, and/or sent 406 to the encryption layer 402 and received 407 by it. In various instances the encryption layer 402 may also store 407 the deployment file. In numerous instances an encryption key or specific data or information to encrypt or decrypt the received 404 deployment file is received 408 from the same source that transmitted or sent the deployment file to the controller node 401, for example a client-side operator, application, or system. In several aspects the sensitive metadata or sensitive label metadata is received 404 in an encrypted form with the keys to decrypt it, while in other aspects, the sensitive label metadata is received in a decrypted form and data is received 408 to allow the controller node 401 or other component of system 400 to encrypt or make the label metadata inaccessible to other nodes such as worker node 403 or other parts of system 400.

In some aspects, no encryption key is received 408 by controller node 401, but an encryption key may be generated 409 by the encryption layer 402. The encryption layer encrypts the label metadata classified as sensitive or private, and then generates the encryption key. The generated encryption key may then be received 408 by the controller node 401 from the encryption layer 402 and then stored 410 by the controller node 401. Therefore the encryption key may be received 408 either from an external source to system 400, such as a client-side process, or be received after being generated 409 by the encryption layer 402. The metadata that is received 404, may be received as already encrypted, or be encrypted by one one or more components of system 400. In several aspects the encryption key and the sensitive metadata or label it is able to encrypt/decrypt are associated together 411, in most aspects this is done by controller node 401, but in alternative aspects this association 411 of the encryption key with a specific label or sensitive metadata may be undertaken by other parts of system 400 such as the encryption layer 402.

In various aspects, the controller node determines 412 that data is needed by a worker node 403, the data may contain or comprise, partially or in full, sensitive metadata or label(s) that needs to be decrypted or made available to the worker node 403. The determining 412 may arise as a result of a request 413 from a worker node 403, or by the controller node 401 receiving other information or data indicating that the sensitive metadata or data containing sensitive metadata is required by worker node 403 or by pods/containers run on worker node 403. In various embodiments the determining 412 may be made because of the need to generate a report by controller node 401, reports that may run on a time-schedule or be predetermined in their frequency or based on specific events or outcomes. Finally, the determining 412 may be a result of a scheduler, controller manager, or other component of controller node 401 determining that the worker node 403, or an application, process, or pod on worker node 403 should receive the sensitive metadata or the data containing the sensitive metadata. In most embodiments, the data is run through encryption layer 402 and transmitted 414 to the worker node 403. Once the data or sensitive metadata contained within it is received 415 by encryption layer 402, the encryption layer 402 may apply various processes on it depending on the classification or sensitivity level of the metadata and the need for the data within the sensitive metadata or the label.

In various aspects the encryption layer 402 decrypts 416 sensitive metadata or label metadata via the encryption key. The worker node 403 then receives 417 the decrypted label metadata or sensitive metadata. This could occur for example if it is determined or known to one or more of the controller node 401 or encryption layer 402 that the decrypted information, or label metadata is required by the worker node 403 or the application running on the worker node 403, to either use the labels or their values or to make changes to them, such as using them as counters in runtime processes. In other aspects, the encryption layer 402 determines that the encryption is to be maintained on the sensitive metadata, either because it is known or determined by one or more of the controller node 401 or encryption layer 402 that the encrypted sensitive metadata or labels are not needed by the worker node 403, this could for example occur when the metadata is part of a larger data package, where a portion of the data package may be used by the worker node 403, without requiring use of the label or other sensitive encrypted metadata. In several aspects the encryption layer 402 provides 418 the label or sensitive metadata in an encrypted form to be received 419 by worker node 403. In some aspects the encryption layer 402 determines that the sensitive metadata or label metadata is to remain encrypted, but the receiving worker node should receive the encryption key to be able to decrypt the label metadata itself, and thus provides 420 the encryption key with the sensitive metadata to the worker node which receives 421 the encrypted sensitive metadata with the encryption key it can use to decrypt the sensitive metadata. In other embodiments, instead of an encryption key being provided, the encryption layer 402 provides 422 decryption data, instructions, decryption mechanisms, or information to worker node 403, so that once worker node 403 receives 423 the sensitive metadata along with the decryption data it is able to utilize the decryption data, mechanism, or information to decrypt the encrypted sensitive metadata. Steps 420 or 422 may occur, for example, when the encryption layer either wants to delegate the processing or resource usage to a worker node 403 for decrypting the data, this is especially relevant when the processes that require the label or sensitive metadata are unknown or obscure to the encryption layer 402, and therefore are better handled by the worker node 403 that can decrypt and extract the relevant information only when necessary or required by it or its processes.

Figure 5:
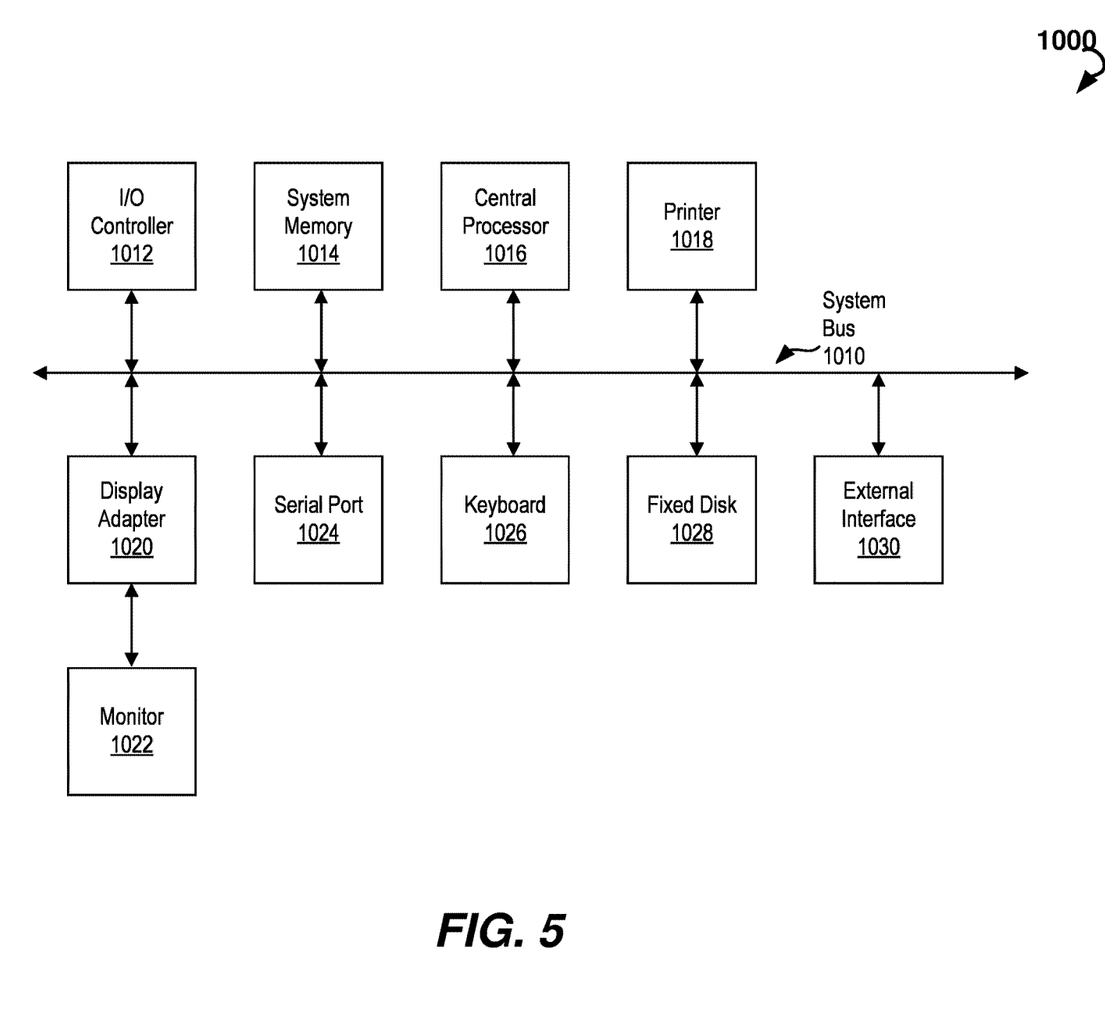
FIG. 5 presents a block diagram of a computer apparatus, according to at least aspect of the present disclosure.

FIG. 5 presents an example computer apparatus or subsystems that may be used to perform the methods and functions described herein. The example computer apparatus 1000 also referred to herein as subsystems 1000 are interconnected via a system bus 1010. Additional subsystems such as a printer 1018, keyboard 1026, fixed disk 1028 (or other memory comprising computer readable media), monitor 1022, which is coupled to display adapter 1020, and others are shown. Peripherals and input/output (I/O) devices, which couple to I/O controller 1012 (which can be a processor or other suitable controller), can be connected to the computer system by any number of means known in the art, such as serial port 1024. For example, serial port 1024 or external interface 1030 can be used to connect the computer apparatus to a wide area network such as the Internet, a mouse input device, or a scanner. The interconnection via system bus 1010 allows the central processor 1016 to communicate with each subsystem and to control the execution of instructions from system memory 1014 or the fixed disk 1028, as well as the exchange of information between subsystems. The system memory 1014 and/or fixed disk 1028 may embody a computer readable medium.

Figure 6:
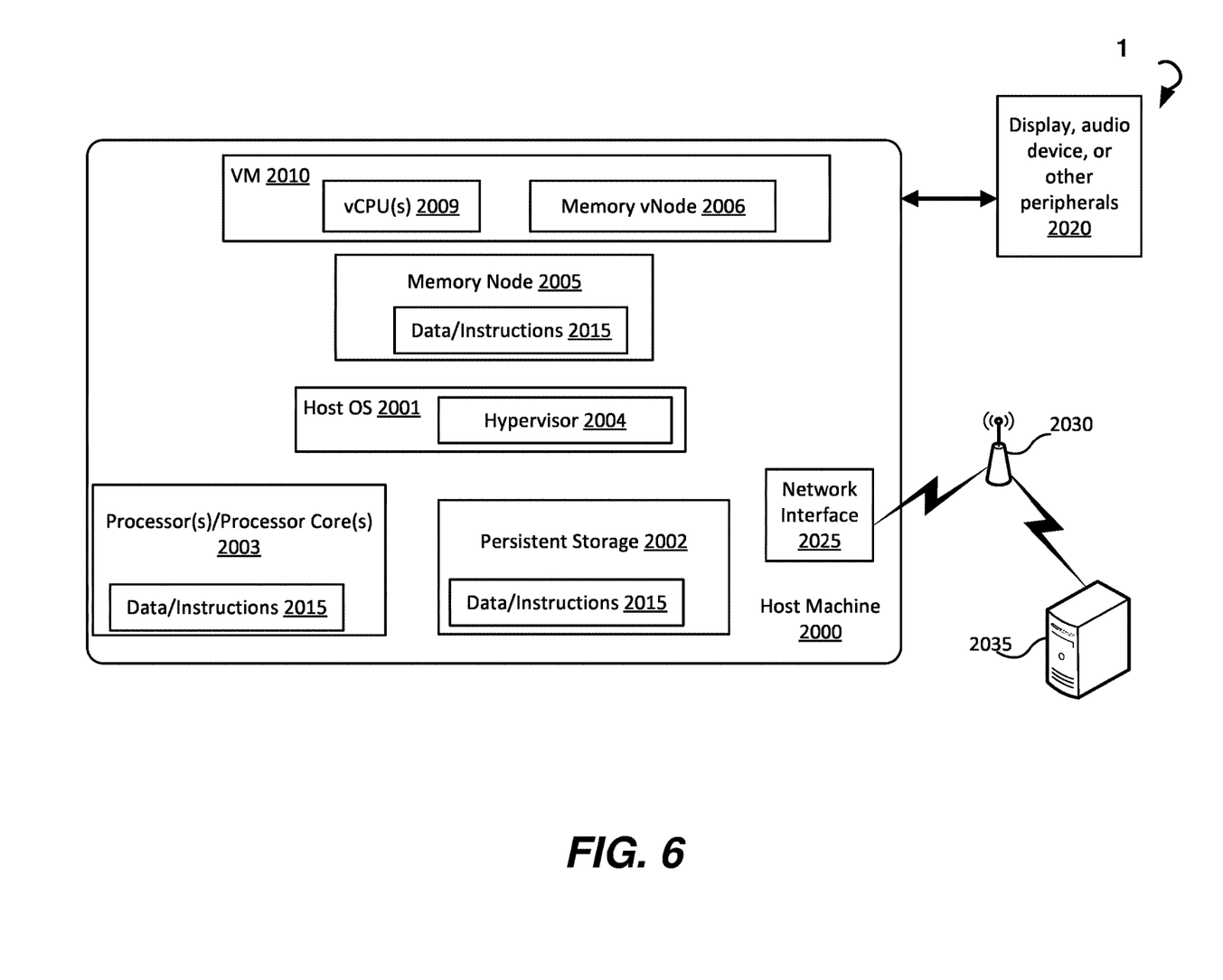
FIG. 6 is a diagrammatic representation of an example system that includes a host machine within which a set of instructions to perform any one or more of the methodologies discussed herein.

FIG. 6 is a diagrammatic representation of an example system 1, with a host machine or computing device 2000, within which a set of instructions for causing the machine to perform any one or more of the methodologies discussed herein may be executed. In various example embodiments, the machine operates as a standalone device or may be connected (e.g., networked) to other machines. In a networked deployment, the host machine 2000 may operate in the capacity of a server or a client machine in a server-client network environment, or as a peer machine in a peer-to-peer (or distributed) network environment. The host machine 2000 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 1 includes the host machine 2000, running a host operating system (OS) 2001 on a processor or multiple processor(s)/processor core(s) 2003 (e.g., a central processing unit (CPU), a graphics processing unit (GPU), or both), and various memory nodes 2005. Host OS 2001 may include a hypervisor 2004 which is able to control the functions and/or communicate with a virtual machine ("VM") 2010 running on machine readable media. VM 2010 may also include a virtual CPU or vCPU 2009. Memory nodes 2005, and 2007 may be linked or pinned to virtual memory nodes or vNodes 2006 respectively. When a memory node 2005 is linked or pinned to a corresponding virtual node 2006, then data may be mapped directly from the memory nodes 2005 to their corresponding vNodes 2006.

All the various components shown in host machine 2000 may be connected with and to each other, or communicate to each other via a bus (not shown) or via other coupling or communication channels or mechanisms. The host machine 2000 may further include a video display, audio device or other peripherals 2020 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker) a persistent storage device 2002 (also referred to as disk drive unit), and a network interface device 2025. The host machine 2000 may further include a data encryption module (not shown) to encrypt data.

The components provided in the host machine 2000 are those typically found in computer systems that may be suitable for use with embodiments of the present disclosure and are intended to represent a broad category of such computer components that are known in the art. Thus, the system 1 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 2002 may also be a Solid-state Drive (SSD), a hard disk drive (HDD) or other includes a computer or machine-readable medium on which is stored one or more sets of instructions and data structures (e.g., data or instructions 2015) embodying or utilizing any one or more of the methodologies or functions described herein. The instructions 2015 may also reside, completely or at least partially, within the main memory node 2005 and/or within the processor(s) 2003 during execution thereof by the host machine 2000. The processor(s) 2003, and memory nodes 2005 may also comprise machine-readable media.

The instructions 2015 may further be transmitted or received over a network 2030 via the network interface device 2025 utilizing any one of several well-known transfer protocols (e.g., Hyper Text Transfer Protocol (HTTP)). The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the machine 2000 and that causes the machine 2000 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 3030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 2000, with each server 2035 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

Some descriptions of terms used herein are provided below.

An "application" may include any software module configured to perform a specific function or functions when executed by a processor of a computer. Applications may be configured to perform many different functions. An "application" may be computer code or other data stored on a computer readable medium (e.g. memory element or secure element) that may be executable by a processor to complete a task.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may be a mobile device or a non-mobile device, such as a desktop computer. Furthermore, the term "computer" may refer to any computing device that includes the necessary components to send, receive, process, and/or output data, and normally includes a display device, a processor, a memory, an input device, a network interface, and/or the like.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Reference to "a server" or "a processor," as used herein, may refer to a previously-recited server and/or processor that is recited as performing a previous step or function, a different server and/or processor, and/or a combination of servers and/or processors.

As used herein, the term "system" may refer to one or more computing devices, software, processes, and programs, and combinations of computing devices (e.g., processors, servers, client devices, software applications, components of such, and/or the like).

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The embodiments can be combined, other embodiments can be utilized, or structural, logical, and electrical changes can be made without departing from the scope of what is claimed. It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. The detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.).

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect,", an embodiment", "one embodiment", "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all sub-ranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

What is claimed is:

1. A method for securing metadata comprising:
   receiving a deployment file providing instructions to deploy software, wherein the deployment file comprises metadata, and wherein the deployment file assigns a sensitivity classification to at least a portion of the metadata to indicate sensitive metadata to which access is restricted;
   receiving an encryption key, wherein the encryption key is associated with the sensitive metadata;
   storing the sensitive metadata, wherein the sensitive metadata is encrypted using the encryption key;
   storing the encryption key;
   determining that data is required by a node to perform a task, wherein the data includes the sensitive metadata, wherein the node is associated with access permissions that specify a level of information that the node is permitted to access;
   determining that the node is eligible to access the sensitive metadata by comparing the sensitivity classification with the access permissions of the node; and
   subsequent to determining that the node is eligible to access the sensitive metadata, providing the sensitive metadata to the node in an encryption state determined based on the task, the encryption state comprising an encrypted state or a decrypted state.

2. The method of claim 1, wherein determining that the data is required by the node, comprises at least one of the following:
   receiving a request from the node for the data, wherein the requested data includes the sensitive metadata; or
   determining by a controller, that an application, pod, or process associated with the node requires the data.

3. The method of claim 1, wherein the providing of the sensitive metadata, comprises providing the sensitive metadata to the node in the encrypted state that is inaccessible to the node.

4. The method of claim 1, wherein the providing of the sensitive metadata, comprises:
   decrypting the sensitive metadata that is stored in the encrypted state inaccessible to the node, wherein the sensitive metadata is decrypted using the encryption key; and
   providing at least a portion of the decrypted sensitive metadata to the node, wherein the at least a portion of the decrypted sensitive metadata is provided to the node based on a request from the node for the data or the access permissions of the node.

5. The method of claim 1, further comprising:
   providing the encryption key and the sensitive metadata in the encrypted state to the node, wherein the sensitive metadata is to be decrypted by the node using the provided encryption key.

6. The method of claim 1, further comprising:
   providing decryption information and the sensitive metadata in the encrypted state to the node, wherein the sensitive metadata is to be decrypted by the node using the provided decryption information.

7. The method of claim 1, wherein the associated encryption key is stored in an unencrypted format.

8. The method of claim 1, wherein the sensitive metadata is a label.

9. A method of securing and storing sensitive data, comprising:
   receiving a deployment file providing instructions to deploy software, wherein the deployment file comprises metadata, and wherein the deployment file assigns a sensitivity classification to at least a portion of the metadata to indicate sensitive metadata to which access is restricted;
   associating an encryption key with the sensitive metadata;
   receiving a request from a node to obtain data to perform a task, wherein the requested data includes the sensitive metadata, wherein the node is associated with access permissions that specify a level of information that the node is permitted to access;
   determining that the node is eligible to access the sensitive metadata by comparing the sensitivity classification with the access permissions of the node; and
   subsequent to determining that the node is eligible to access the sensitive metadata, providing the sensitive metadata to the node in an encryption state determined based on the task, the encryption state comprising an encrypted state or a decrypted state.

10. The method of claim 9, further comprising receiving the encryption key.

11. The method of claim 9, further comprising generating the encryption key.

12. The method of claim 9, further comprising:
    decrypting the sensitive metadata that is stored in the encrypted state inaccessible to the node, wherein the sensitive metadata is decrypted with the encryption key; and
    providing at least a portion of the decrypted sensitive metadata to the node, wherein the at least a portion of the decrypted sensitive metadata is provided to the node based on the request or the access permissions of the node.

13. The method of claim 9, further comprising at least one of the following:
    storing the sensitive metadata; and
    storing the encryption key.

14. The method of claim 9, wherein the providing comprises:
    decrypting the sensitive metadata using the encryption key; and
    providing decrypted metadata to the node.

15. The method of claim 9, further comprising:
    providing the encryption key and the sensitive metadata in the encrypted state to the node, wherein the sensitive metadata is to be decrypted by the node using the provided encryption key.

16. The method of claim 9, further comprising:
    providing decryption information to the node and the sensitive metadata in the encrypted state, wherein the sensitive metadata is to be decrypted by the node using the provided decryption information.

17. A container orchestration system, comprising:
    a plurality of worker nodes, wherein each worker node of the plurality of worker nodes is configured to run application containers;
    a controller node configured to orchestrate application container deployment on the plurality of worker nodes via a virtual network layer, wherein the plurality of worker nodes and the controller node form a cluster, the controller node comprising an API server that serves as an entry point to the cluster; and
    an encryption layer run on the controller node, the controller node comprising a processor device and a non-transitory computer readable medium storing instructions executable by the processor device to:
        receive, via the API server and by the controller node, a deployment file providing instructions to deploy, wherein the deployment file assigns a sensitivity classification to at least a portion of metadata included in the deployment file to indicate sensitive metadata to which access is restricted;
        associate an encryption key with the sensitive metadata;
        receive, by the controller node and from at least one worker node, a request to provide data to the at least one worker node of the plurality of worker nodes, from either the controller node or from the plurality of worker nodes, wherein the requested data includes the sensitive metadata and is to be used by the at least one worker node to perform a task, wherein each worker node is associated with a respective set of access permissions that specify a respective level of information that each worker node is permitted to access;
        determine that the at least one worker node is eligible to access the sensitive metadata by comparing the sensitivity classification with the respective set of access permissions of the at least one worker node; and
        subsequent to determining that the at least one worker node is eligible to access the sensitive metadata, provide, by the controller node, the sensitive metadata to the at least one worker node in an encryption state determined based on the task, the encryption state comprising an encrypted state or a decrypted state.

18. The container orchestration system of claim 17, wherein the instructions are further executable by the processor device to:
    encrypt the sensitive metadata to provide the sensitive metadata in the encrypted state, wherein the sensitive metadata is encrypted with the encryption key.

19. The container orchestration system of claim 17, wherein the instructions are further executable by the processor device to:
    decrypt the sensitive metadata that is stored in the encrypted state inaccessible to the at least one worker node, wherein the sensitive metadata is decrypted using the encryption key; and
    provide at least a portion of the decrypted sensitive metadata to the at least one worker node, wherein the at least a portion of the decrypted sensitive metadata is provided to the at least one worker node based on the request or the respective set of access permissions of the at least one worker node.

20. The container orchestration system of claim 17, wherein the instructions are further executable by the processor device to perform at least one of the following:
    provide the encryption key and the sensitive metadata in the encrypted state to the at least one worker node, wherein the sensitive metadata is to be decrypted by the at least one worker node using the provided encryption key; or
    provide decryption information and the sensitive metadata in the encrypted state to the at least one worker node, wherein the sensitive metadata is to be decrypted by the at least one worker node using the provided decryption information.

* * * * *